Figure 4:
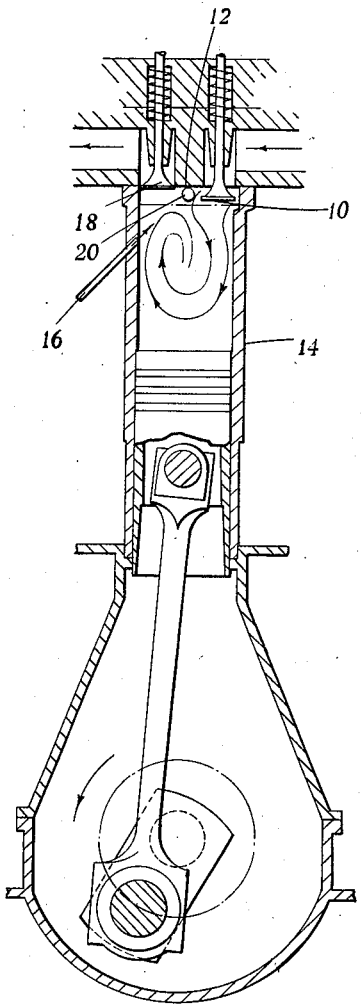

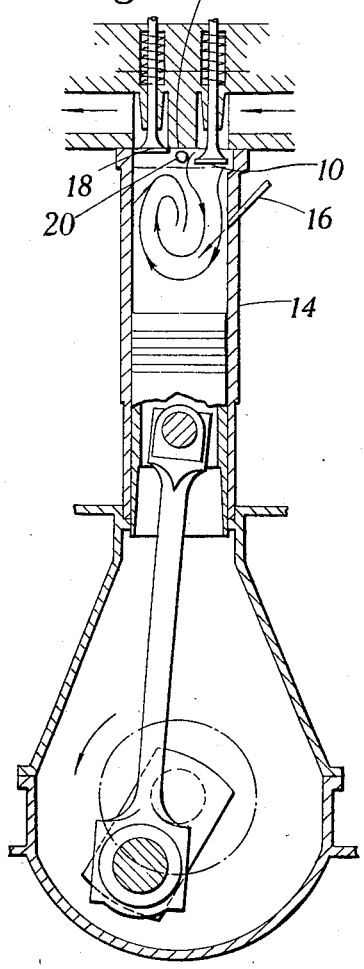
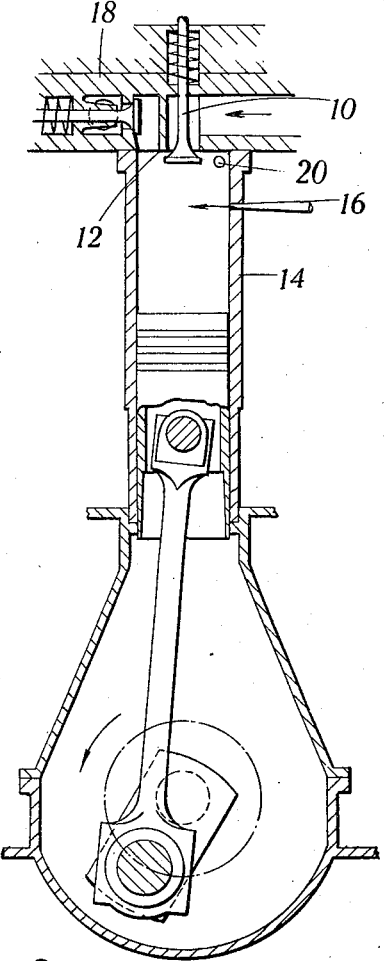
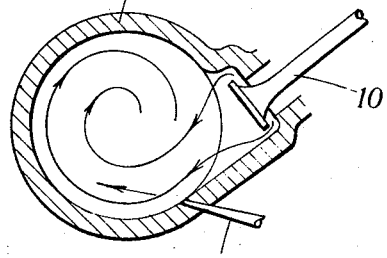

Dec. 19, 1939.   R. A. ERREN   2,183,674
INTERNAL COMBUSTION ENGINE USING HYDROGEN AS FUEL
Filed Sept. 10, 1936    2 Sheets-Sheet 2

INVENTOR:
Rudolf Arnold Erren,
BY
Frank S. Appleman,
ATTORNEY.

Patented Dec. 19, 1939

2,183,674

UNITED STATES PATENT OFFICE 2,183,674

INTERNAL COMBUSTION ENGINE USING HYDROGEN AS FUEL

Rudolf Arnold Erren, London, England

Application September 10, 1936, Serial No. 100,201
In Great Britain September 12, 1935

1 Claim. (Cl. 123—27)

This invention relates to internal combustion engines in which hydrogen is injected into the cylinder under excess pressure after the oxygen (whether this is contained in air or is used in admixture with an expansion medium other than air, for example, steam) has been introduced into the cylinder.

It has been found in practice that inefficient working is sometimes obtained in such engines and experiments have shown that this inefficient working is due to insufficient mixing of the hydrogen and the other gases. In addition to inefficient working, in some conditions the engine may actually be destroyed by an explosion in the crankcase due to a cushion of unmixed hydrogen being formed immediately above the piston, this hydrogen escaping past the piston ring into the crankcase and being ignited by flames penetrating past the piston rings. In other cases back firing in the air intake pipe is caused by unmixed hydrogen escaping past the valve seating and being ignited in a similar manner.

It has been found that these disadvantages and dangers are avoided by the present invention according to which hydrogen is injected through a valve situated in the cylinder wall itself during the early part only of the compression stroke and preferably in a direction which makes an angle not greater than, and preferably less than, 90° to the direction in which the air or other gases are circulating in the cylinder in the region where the hydrogen is injected.

The injection of hydrogen begins preferably immediately the inlet valve has closed, that is, at latest at 220° of the cycle, and ends at latest at 280° of the cycle, the hydrogen injection pipe opening into the cylinder at that part of the cylinder wall traversed by the piston and above the lowest position of the piston.

Referring to the accompanying diagrammatic drawings,

Figure 1 represents a hydrogen internal combustion engine embodying the invention in one form, the view being a side elevation in cross-section, Figure 2 represents a modified form of the invention, the view being a sectional plan of the engine cylinder, Figure 3 is a view similar to Figure 1 illustrating a further modification, and Figure 4 is a view similar to Figure 1 illustrating another modification.

The nature of the swirling motion within the cylinder varies according to the design of the cylinder head and of the inlet valve. In Figure 1 the air inlet valve 10 is shown mounted in the cylinder head 12 between the axis of the cylinder and the cylinder wall 14. The entering air will therefore swirl in a clockwise direction as shown by the arrows. According to the invention the hydrogen injection pipe 16 is placed either near the top of the cylinder wall 14 on the air inlet valve side of the cylinder and pointing obliquely downwards as shown in Figure 1, or somewhat further up the cylinder wall and pointing obliquely upwards on the side of the cylinder remote from the air inlet valve 10, as shown in Figure 4. In either case the hydrogen enters the cylinder in a direction which makes an acute angle with the direction of the swirling air adjacent to the hydrogen injection pipe, and consequently the hydrogen mixes intimately with the air in a minimum of time.

Referring now to Figure 2, the air inlet valve 10 is situated in the cylinder wall 14 and its axis is horizontal but obliquely placed so that when produced it does not intersect the axis of the cylinder 14 but passes well to one side of it. Thus, air entering the cylinder through this valve forms a horizontal swirl rotating in the clockwise direction within the cylinder. In this case the hydrogen injection pipe 16 is situated in the cylinder wall and is arranged horizontally but directed obliquely as shown, so that the direction in which the hydrogen enters the cylinder makes an acute angle with the direction in which the air is swirling in the immediate neighbourhood of the hydrogen injection pipe.

Figure 3 illustrates one example of an engine in which the air enters in such a way that no definite circulation or swirling motion is set up. The air inlet valve 10 is in this case in the centre of the cylinder head and at the beginning of the compression stroke there is no definite circulation of air within the cylinder, and the velocity of any such circulation as there may be is small. In such a case the hydrogen injection pipe 16 is situated in the cylinder wall and is arranged to intersect the axis of the cylinder perpendicularly thereto. It is placed at a distance of about one-third of the piston stroke from the inner dead centre position, although this distance may vary from one-quarter to two-fifths of the stroke. This pipe need not, however, be perpendicular to the cylinder axis; if found more convenient it may be inclined obliquely to the cylinder axis towards the interior of the cylinder. If it is inclined upwardly its point of entry into the cylinder is placed lower than is stated above, whereas if it is inclined downwardly the point of entry is higher in the cylinder wall, so that in each case its axis intersects the axis of the cylinder between the limiting positions already mentioned.

As already stated, the injection of hydrogen, in forms of the invention such as are exemplified by Figures 1 and 2, occupies about 60° of the cycle, beginning at 220° (that is, 40° after outer dead centre) and ending not later than 280°, that is 80° before inner dead centre. In all such cases the hydrogen injection pipe opens immediately the air inlet valve has closed completely and it should remain open for at least 40° of the cycle. The pressure at which the hydrogen is injected in these cases may be about 1 atmosphere higher than the maximum pressure which the gases within the cylinder attain during the injection period. In cases such as are exemplified by Figure 3 the time during which the hydrogen injection pipe is open is substantially less than in the other cases (for example 30° of the cycle) and the pressure is substantially higher, for example 2 to 3 atmospheres above the maximum pressure within the cylinder during the injection period. Throughout the above description the word "air" is to be understood as signifying any mixture of oxygen with another gas or gases of an inert nature; thus, instead of atmospheric air a mixture of oxygen and steam may be employed.

In Figures 1 and 3 of the drawings the exhaust valve is indicated at 18. In Figure 2 this valve is in the cylinder head and is therefore not shown. The sparking plug for igniting the compressed mixture of hydrogen, oxygen and inert gas is indicated at 20. As shown clearly in the drawings, the hydrogen injection pipe opens into the cylinder at that part of the cylinder wall traversed by the piston and above the lowest position of the piston.

I claim:

In an internal combustion engine, a cylinder, a piston of uniform diameter throughout reciprocable in said cylinder, said cylinder having a head at one end, valve means at the head end of the cylinder for supplying a mixture of oxygen and an inert gas, said valve means being flared to spread the entering gases and a hydrogen inlet pipe opening into said cylinder at a point traversed by the piston and spaced from the head end of said cylinder, said piston cutting off the inlet of said pipe.

RUDOLF ARNOLD ERREN.